(12) United States Patent
Shaw et al.

(10) Patent No.: US 7,970,045 B2
(45) Date of Patent: Jun. 28, 2011

(54) METHOD AND DEVICE FOR ADAPTING A SIGNAL

(75) Inventors: Amit Shaw, Bangalore (IN); Satyam Srivastava, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 928 days.

(21) Appl. No.: 11/829,887

(22) Filed: Jul. 28, 2007

(65) Prior Publication Data

US 2009/0028233 A1   Jan. 29, 2009

(51) Int. Cl.
*H04B 17/00* (2006.01)
(52) U.S. Cl. ......... 375/224; 375/225; 375/226; 375/150
(58) Field of Classification Search .................. 375/224, 375/226, 227, 220
See application file for complete search history.

(56) References Cited

U.S. PATENT DOCUMENTS

| 2006/0050776 A1* | 3/2006 | Moon et al. | 375/222 |
| 2007/0217532 A1* | 9/2007 | Park et al. | 375/260 |
| 2008/0056421 A1* | 3/2008 | Eglit | 375/355 |

* cited by examiner

*Primary Examiner* — Chieh M Fan
*Assistant Examiner* — Qutbuddin Ghulamali
(74) *Attorney, Agent, or Firm* — Prakash Nama; Global IP Services, PLLC (57) ABSTRACT

A method and device for adapting a signal is provided. The signal includes a number of recurring samples of data. In one example embodiment, the method receives recurring samples of data. Each of the samples of data includes a first number of elements. A second number of elements are selected from at least one of the recurring samples. The second number of elements is approximately less than the first number of elements. The selected second number of elements are substituted with respective phase altered elements. The subject matter also provides a method and device for identifying a signal property(ies) and a computer system for implementing these methods.

14 Claims, 9 Drawing Sheets

METHOD AND DEVICE FOR ADAPTING A SIGNAL

FIELD OF THE SUBJECT MATTER

The present subject matter relates to communication systems, more particularly, it relates to a method and device for adapting a communication signal and identifying properties of the communication signal.

BACKGROUND

Error free and reliable reception of communicated data is desirable features in a communication system. The communication system transmits data in chunks ("packets") of encoded frames. Each of the encoded frames includes a preamble and a data section. The preamble may include information for allowing a receiver to synchronize the received frame and other information relating to the data being transmitted. Typically, the preamble includes samples of recurring data. These samples of recurring data are correlated to obtain correlation values at the receiver. The boundary of the preamble is identified by the obtained correlation values.

The samples in a preamble are chosen such that when recurring samples of data is correlated with a subsequent recurring samples of data, the value obtained by such correlation is expected to cross a threshold value. However, when a sample is correlated with a sample which is not the same (i.e. not recurring), then the value obtained by such correlation can fall sufficiently below the threshold value. In such a case, the boundary of the preamble is considered to be the sample for which the obtained correlation value is below the threshold for the first time. Since samples are recurring in nature but after the boundary it is assumed that the recurring nature of the samples diminished and a sharp fall in the obtained correlation value is observed.

The systems operating according to the above description may work fine for white Gaussian noise under mild delay spread channel conditions. However, at high delay spread channel the correlation based threshold detection performance deteriorates as the spread of the channel can affect the threshold detection.

BRIEF DESCRIPTION OF FIGURES

Embodiments of the invention will now be described, by way of example only, with reference to the accompanying drawings in which.

DETAILED DESCRIPTION

In the following detailed description of various embodiments of the invention, reference is made to the accompanying drawings that form a part hereof, and in which are shown by way of illustrating specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
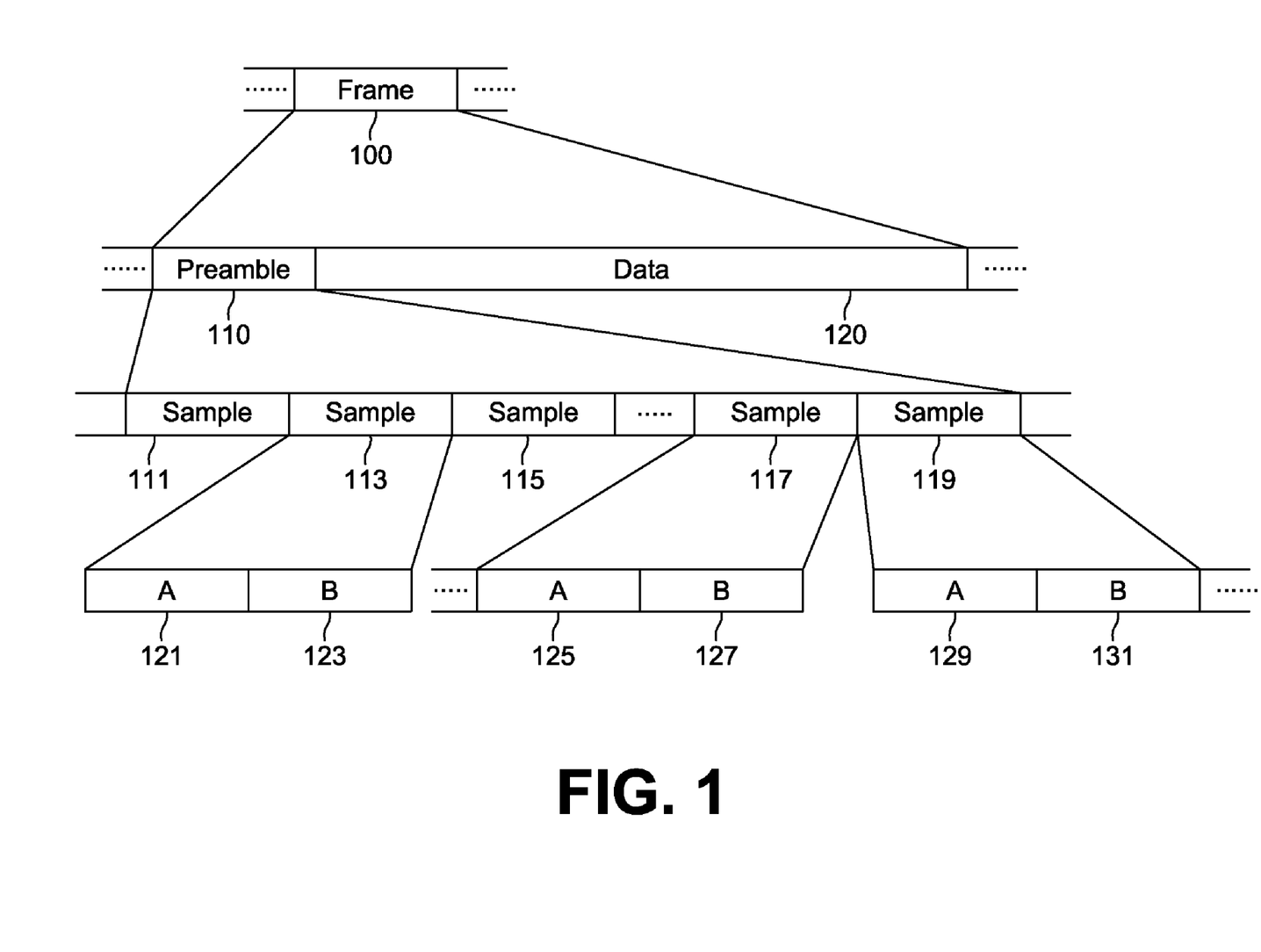
FIG. 1 shows an exploded view of a frame that may be communicated over a communication system.
Figure 2:
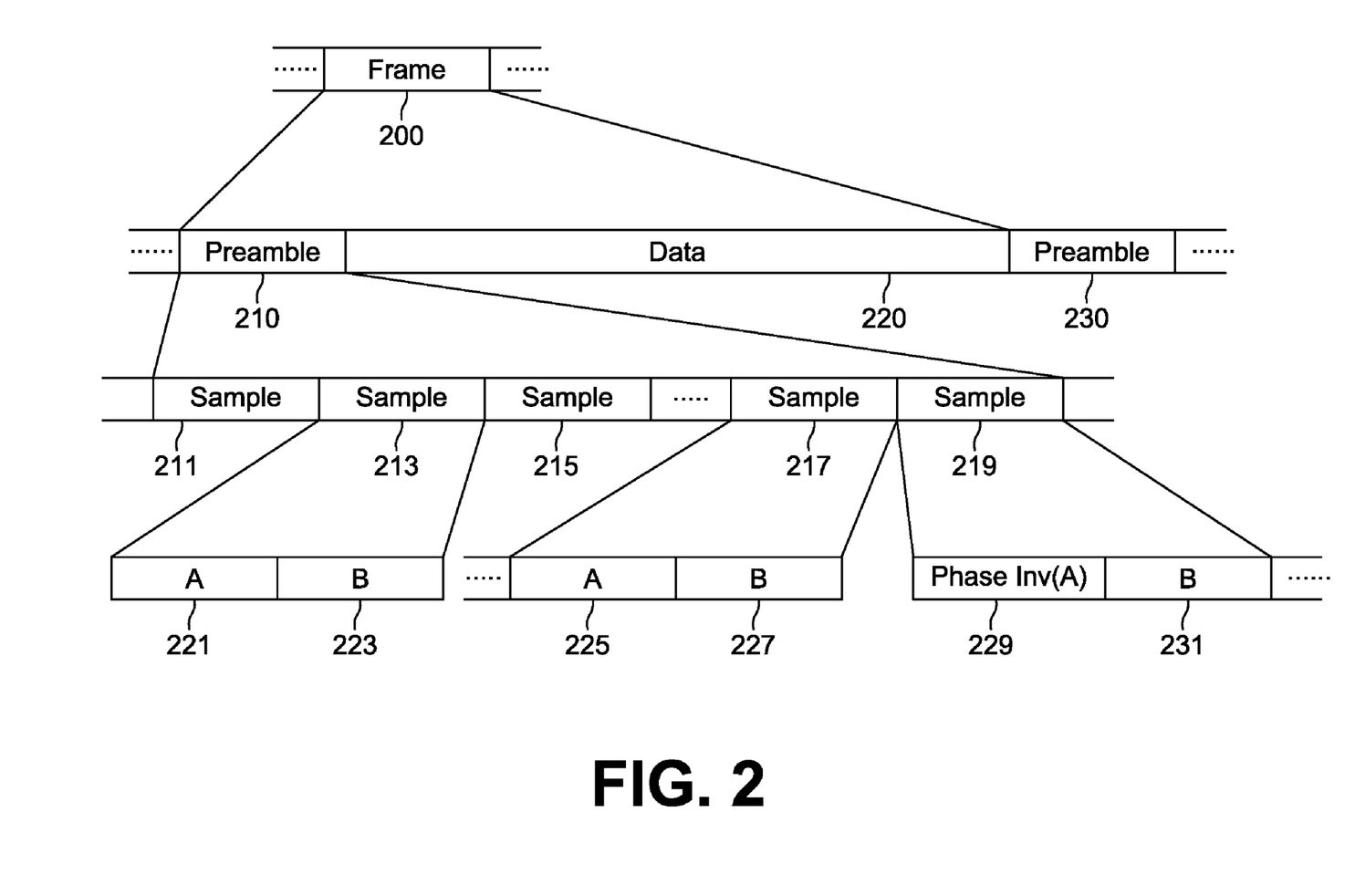
FIG. 2 shows an exploded view of a frame in accordance with an embodiment of the present subject matter.

FIG. 1 shows an example exploded view of a frame 100 that may be communicated over a communication system. The frame 100 includes a preamble 110 and data section 120. In an embodiment, the preamble includes a number of samples 111, 113, 115, 117 and 119. The samples 111, 113, 115, 117 and 119 may include multimedia information. The samples 111, 113, 115, 117 and 119 may be recurring in nature. Each of the samples 111, 113, 115, 117 and 119 includes a number of elements. Each of the number of elements may be a digital bit representing 0 or 1. FIG. 1 also shows exploded views of samples 113, 117 and 119 in which each of these samples contains elements A and B. The samples in the preamble may be correlated with the subsequent samples. At the end of the preamble, the recurring nature of the samples diminishes (because preamble ends at the boundary) and therefore the correlation value obtained by correlating samples of the preamble with the samples appearing after the boundary of the preamble provides a correlation value which is substantially different or lower than an expected value. This deviation in the correlation value identifies the boundary of the preamble. FIG. 2 shows an exploded view of a frame 200 in accordance with an embodiment of the present subject matter. The present subject matter provides method for adapting a signal having the form of frame 200. The frame 200 may include a preamble 210 and a data 220 section. The preamble 210 may include a number of samples of data 211, 213, 215, 217 and 219. The samples included in the preamble 210 may be recurring in nature. FIG. 2 shows exploded view of samples 213, 217 and 219 in which each of these samples contains elements A and B. It should be noted that the elements A and elements B are just used for the purpose of example. Each of the elements A may include a number of elements and similarly each of the elements B may include number of elements. Notably, the sample 219 includes elements Phase Alt(A) and B. The Phase Alt(A) represents phase altered A.

The present subject matter describes a device and method for adapting a signal (i.e. frame) such that the probability of detecting the boundary of the preamble 210 of the frame 200 is substantially high. To achieve this objective, the method, according to an embodiment, includes a step of receiving samples, wherein each of the samples may have a first number of elements. The method further includes a step of selecting a second number of elements of the samples and computing a phase altered value of the selected first and second number of elements and altering the phase of the selected second number of elements in the samples. The phase may be altered by 180 degrees to obtain phase inverted elements Alt (A). The second number of elements is smaller than the first number of elements. The elements may be selected for phase inversion from the sample in any order. The last sample of the preamble may be selected for phase inversion. Any other samples of the preamble may also be selected for phase inversion.

Performing the above steps provides sample 219 that includes elements phase Alt(A) and Alt(B). Such phase alteration substantially ensures that at the receiving end, when the elements of the last sample of the preamble are correlated, a sharp variation in the correlation value is observed. This sharp variation in the correlation value determines the boundary of the preamble. According to embodiment the second number of elements may be half of the first number of elements. The phase altered elements may be distributed in any manner within the samples.

Figure 3:
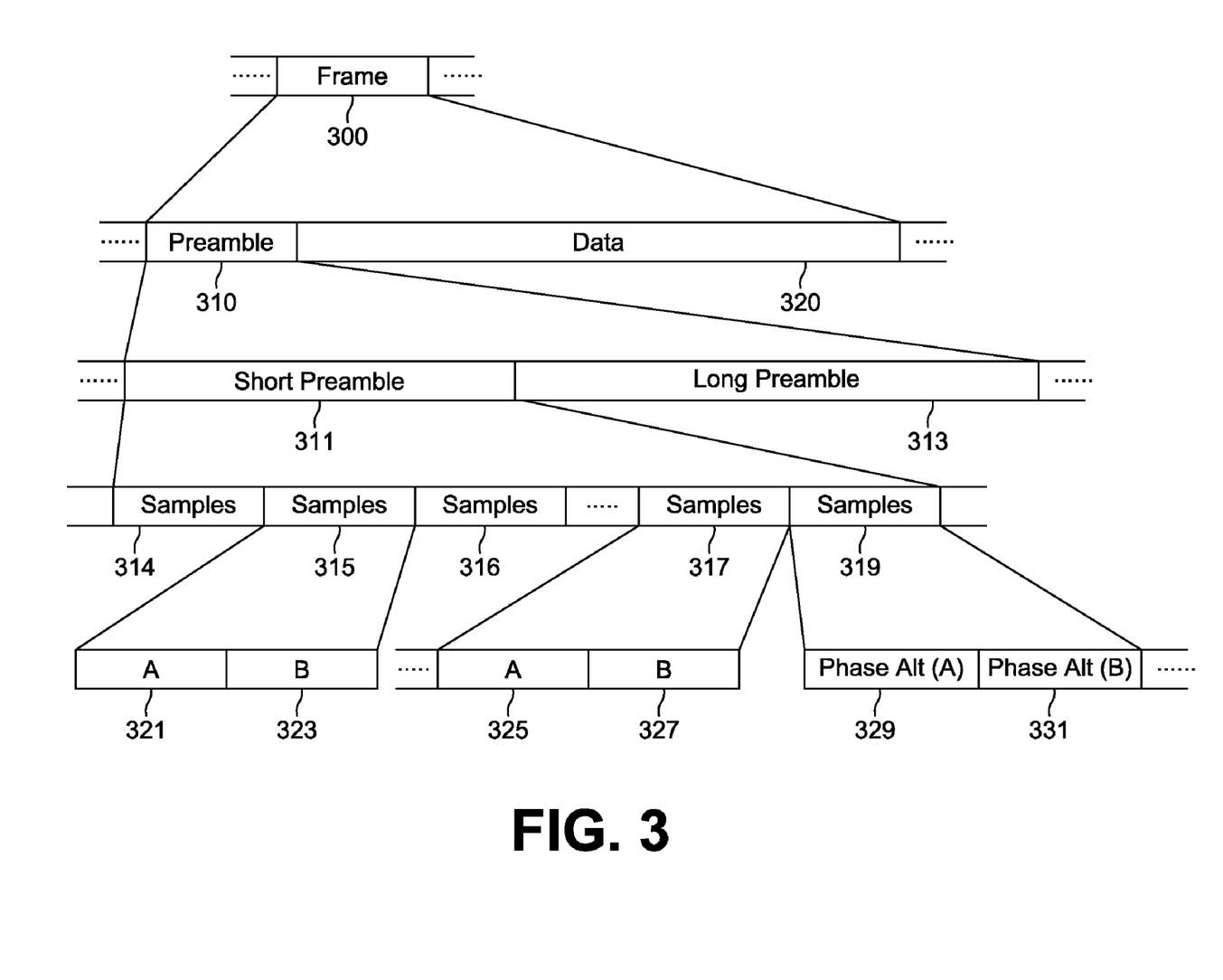
FIG. 3 shows an exploded view of a frame in accordance with another embodiment of the present subject matter.

FIG. 3 shows an exploded view of a frame 300 in accordance with another embodiment of the present subject matter. The frame 300 is generally a frame communicated over a wireless communication system. The frame 300 includes a preamble 310 and data 320 section. As shown in FIG. 3, the preamble 310 may have a short preamble 311 and a long preamble 313. Further, FIG. 3 shows an exploded view of the short preamble 311 including more detail. However, the preamble can also include the long preamble 313. The exploded view of the short preamble 311 shows that it includes samples 314, 315, 316, 317 and 319. The samples may be recurring in nature. Each of the samples includes elements A and B. For example, the present technique can be performed to alter the phase of selected elements of the sample 319. Altering the phase of the elements of the sample 319 may provide elements as shown in FIG. 3, having Phase Alt (A) 329 and Phase Alt (B) 331. The phases of the elements may be altered by 180 degrees.

Figure 4:
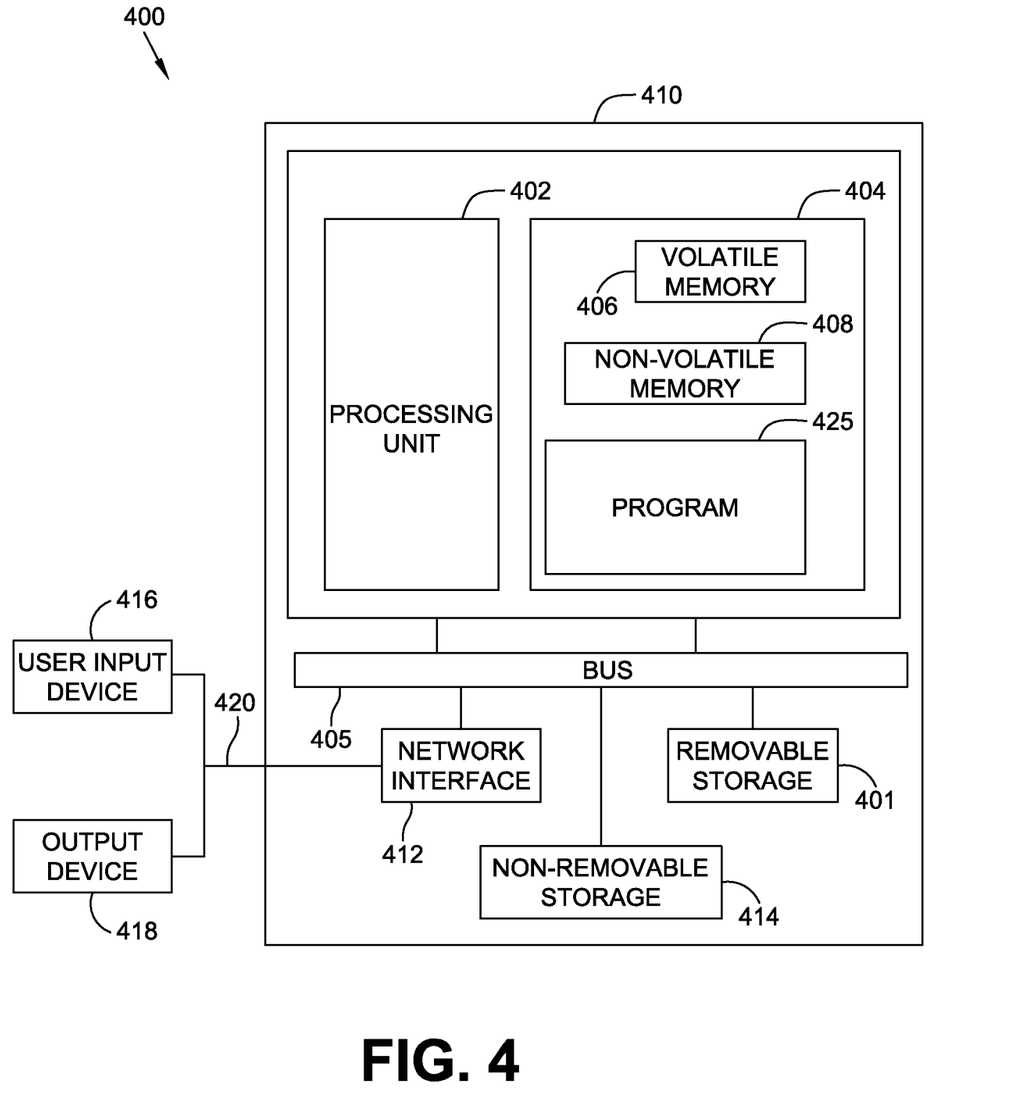
FIG. 4 shows an example of a suitable computing system environment for implementing embodiments of the present subject matter.

FIG. 4 shows an example of a suitable computing system environment 400 for implementing embodiments of the present subject matter. FIG. 4 and the following discussion are intended to provide a brief, general description of a suitable computing environment in which certain embodiments of the inventive concepts contained herein may be implemented.

A general computing device, in the form of a computer 410, may include a processor 402, memory 404, removable storage 401, and non-removable storage 414. Computer 410 additionally includes a bus 405 and a network interface 412.

Computer 410 may include or have access to a computing environment that includes one or more user input devices 416, one or more output devices 418, and one or more communication connections 420 such as a network interface card or a USB connection. The one or more output devices 418 can be a display device of computer, computer monitor, TV screen, plasma display, LCD display, display on a digitizer, display on an electronic tablet, and the like. The computer 410 may operate in a networked environment using the communication connection 420 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 404 may include volatile memory 406 and non-volatile memory 408. A variety of computer-readable media may be stored in and accessed from the memory elements of computer 410, such as volatile memory 406 and non-volatile memory 408, removable storage 401 and non-removable storage 414. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits (ASIC), single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 402 of the computer 410. For example, a program module 425 may include machine-readable instructions capable adapting signal that includes a number of samples of recurring data in accordance with the present subject matter. According to another example a program module 425 may include machine readable instruction capable of identifying a signal property(ies) in accordance with the present subject matter. In one embodiment, the program module 425 may be included on a CD-ROM and loaded from the CD-ROM to a hard drive in non-volatile memory 408. The machine-readable instructions cause the computer 410 to encode according to the various embodiments of the present subject matter.

Figure 5:
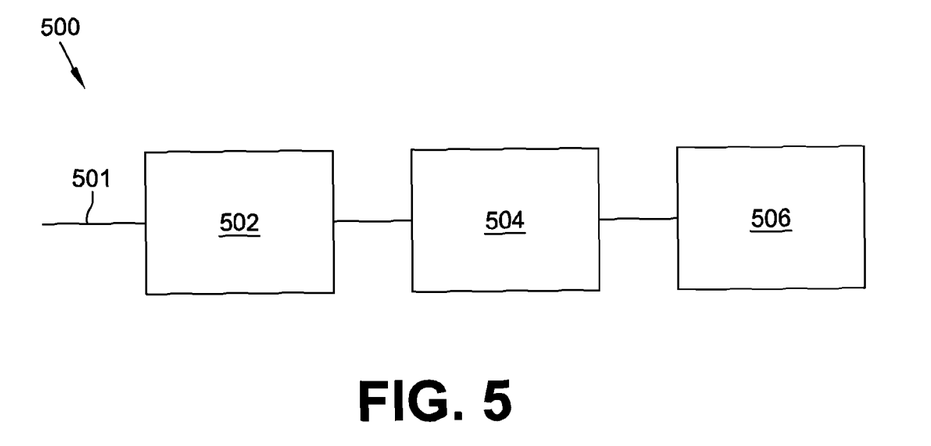
FIG. 5 shows a block diagram of a device for adapting a signal according to an embodiment of the present subject matter.

FIG. 5 shows a device 500 for adapting a signal according to an embodiment of the present subject matter. The signal may include recurring samples of data and may be provided at an input 501 of the device 500. Each of the samples includes a first number of elements. The device 500 has a first unit 502 which is configured for receiving samples of the signal. The first unit 502 may be coupled to a second unit 504. The second unit 504 may be arranged for selecting a second number of elements of at least one of the recurring samples. The second number of elements is smaller than the first number of elements. The second unit 504 may be coupled to a third unit 506 which may be arranged for substituting selected elements with respective phase altered elements. The third unit 506 may also be configured for computing the phase altered values of the selected elements. The third unit 506 may alter the phase of the elements by 180 degrees to provide phase inverted elements Alt (A). The device 504 may select the second number of elements such that the second number of elements is half of the first number of elements. The communication signal provided to the input 501 of the device 500 may include a preamble and a data field.

Figure 6:
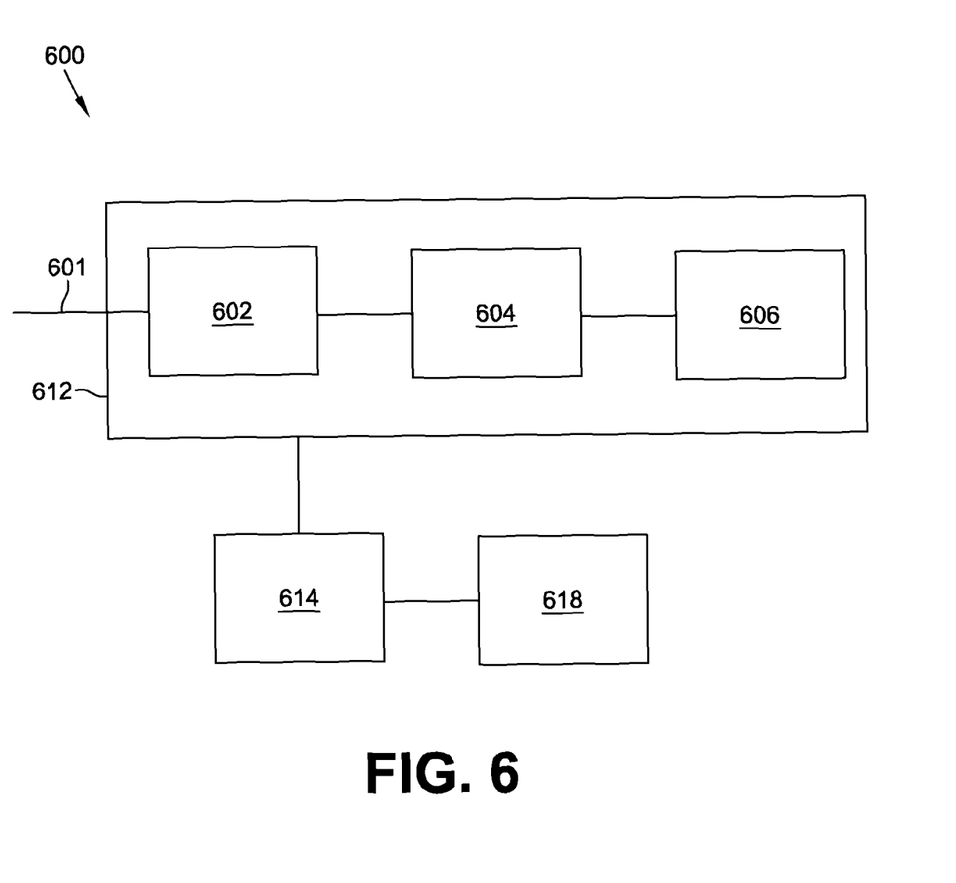
FIG. 6 shows a block diagram of an alternative device for adapting a signal and identifying signal properties according to an embodiment of the present subject matter.

FIG. 6 shows another device 600 for adapting a signal and identifying a signal property(ies) according to an embodiment of the present subject matter. The signal may include recurring samples of data and may be provided at an input 601 of the device 600. Each of the samples includes a first number of elements. The device 600 has an adaptor 612 for adapting the signal. The adaptor 612 includes a first unit 602 which is configured for receiving samples of the signal. The samples may be recurring in nature. The first unit 602 may be coupled to a second unit 604. The second unit 604 may be arranged for selecting a second number of elements of at least one of the recurring samples. The second number of elements is smaller than the first number of elements. The second unit 604 may be coupled to a third unit 606 which may be arranged for substituting selected elements with respective phase altered elements. The third unit 606 may also be configured for computing the phase altered values of the selected elements. The third unit 606 may alter the phase of the elements by 180 degrees to provide phase inverted elements Alt (A). The device 604 may select the second number of elements such that the second number of elements is half of the first number of elements. The communication signal provided to the input 601 of the device 600 may have a preamble and a data field. The adapted signal may be further processed by other elements of the device or may be communicated over a medium. The medium may be a wired or a wireless medium. The adapted signal may be communicated over a wireless medium via an antenna 608. The device 600 further includes a block 615 for identifying a signal property(ies). The block 615 may receive the signal via antenna 608. The received signal may be an adapted signal. The adapted signal may have been received by the block 615 from another device. The block 615 may include a number of components; the adapted signal may be processed by each of these components. The block 615 may also include a computing unit 610 arranged for computing correlation values for each of the samples of the adapted signal. The output of the computing unit 610 may be provided to a comparing unit 614 for comparing the correlation values of each of the sample of the adapted signal. The comparing unit 614 provides indicatives of variation of the correlation values. These indicatives may be used for identifying the adapted signal or signal property(ies). The adapted signal properties can include boundary of the preamble and other such property(ies).

Figure 7:
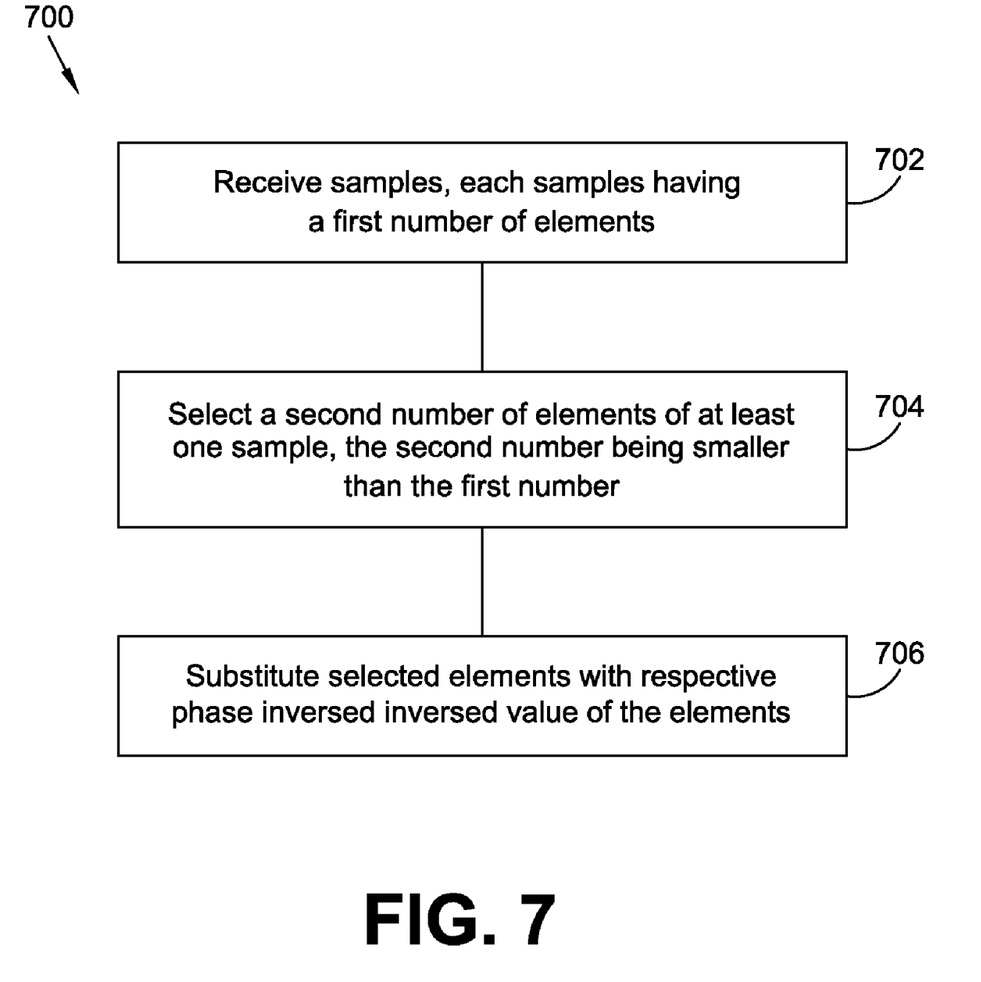
FIG. 7 shows a flow diagram of a method for adapting a signal according to an embodiment of the present subject matter.

FIG. 7 shows a flow diagram 700 of a method for adapting a signal according to the present subject matter. The signal may include a number of samples of data. The samples are recurring in nature and each sample includes a first number of elements. According to the method at step 702 samples are received. At step 704, a second number of elements of at least one of the recurring samples are selected. The second number of elements is smaller than the first number of elements. At step 706, selected elements are substituted with respective phase altered value of the elements. The step 706 may also include step of computing the phase altered value of the selected elements. The step 706 may alter the phase of the elements by about 180 degrees to provide phase inverted elements Alt (A). The second number of elements may be half of the first number of elements. The signal may be a communication signal. The communication signal may include a preamble and a data field. The recurring samples may be part of the preamble field of the communication signal.

Figure 8:
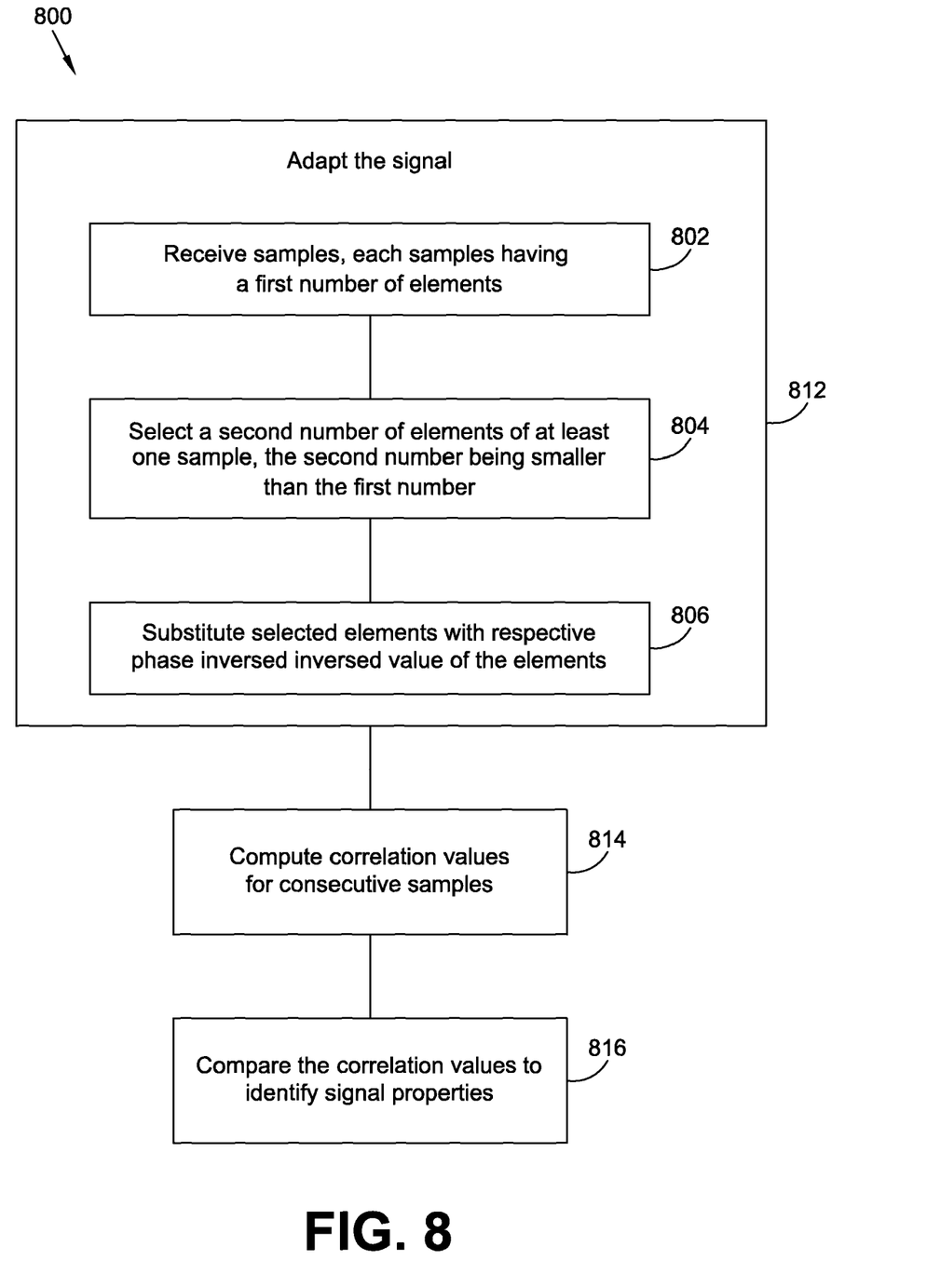
FIG. 8 shows a flow diagram of a method for identifying signal properties according to an embodiment of the present subject matter.

FIG. 8 shows a flow diagram 800 of a method for identifying a signal property(ies) according to the present subject matter. The signal may include a number of samples of data. The samples can be recurring in nature and each sample can include a first number of elements. According to the method at step 812, the signal is adapted. The step 812 of adapting the signal may include steps 802-806. At step 802 samples are received. At step 804, a second number of elements of at least one of the recurring samples are selected. The second number of elements is smaller than the first number of elements. At step 806, selected elements are substituted with respective phase altered value of the elements. The step 806 may also include the step of computing the phase altered value of the selected elements. At step 806, the phase of the elements may be altered by about 180 degrees to provide phase inverted elements, Alt (A). The second number of elements may be half of the first number of elements. The signal may be a communication signal. The communication signal may include a preamble and a data field. The recurring sample may be part of the preamble field of the communication signal. At step 814, correlation values are computed, the correlation values are computed by correlating two consecutive samples of the adapted signal. At step 816, the correlation values are compared to identify signal property(ies).

Figure 9:
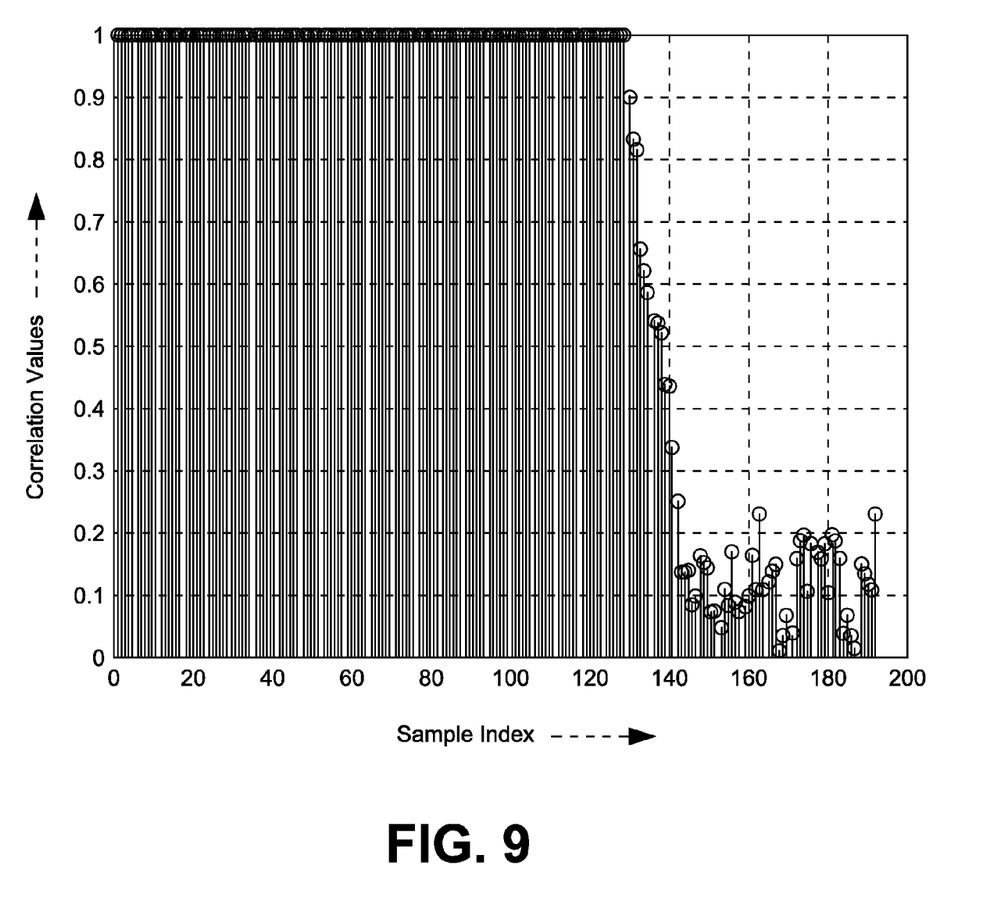
FIG. 9 shows a graph of correlation values against sample index.

FIG. 9 shows a graph of correlation values against a sample index for a signal that may include a frame 100 shown in FIG. 1. The sample index may represent time index of samples for which the correlation value is being computed. From the graph it may be noticed that it requires at least 16 numbers of samples before a considerable drop in correlation value is observed. In this example, the recurring samples are of length 16.

Figure 10:
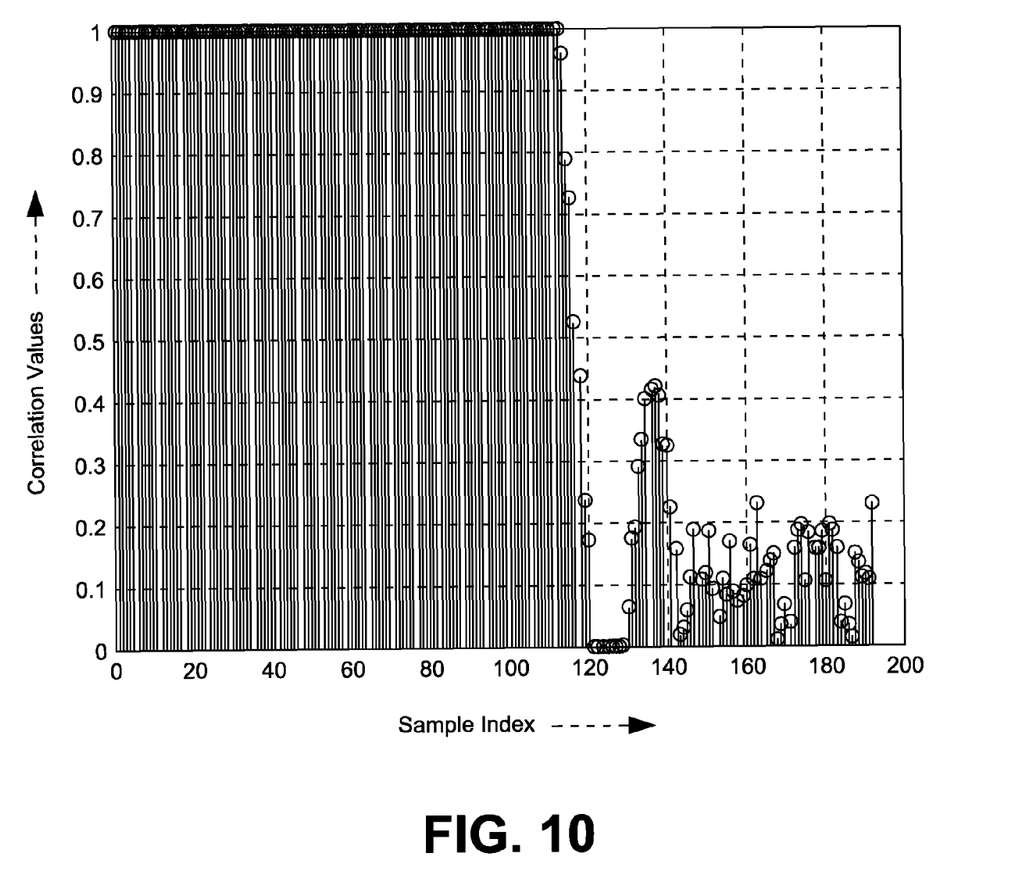
FIG. 10 shows a graph of correlation values against sample index for a signal according to the present subject matter.

On the other hand, FIG. 10 shows a graph of correlation values against sample index for a signal that may include a frame 200 or 300 shown in FIG. 2 or FIG. 3. The sample index may represent time index of samples for which the correlation value is being computed. From the graph it may be noticed that it requires about 8 numbers of samples before a considerable drop in correlation value is observed. Further, it may be noticed that a discontinuity exists between sample index 120 and 136, which indicates the boundary of the preamble. It can be also seen in this example that the recurring samples are of length 16 and the number of elements of the sample for which the phase has been altered is 8. Further, in this example the phase of the elements has been altered by about 180 degrees.

It should be noted that for the purpose of explanation and brevity in the above discussion examples are discussed in which phase of selected elements have been altered by 180 degrees, however a person skilled in the art will appreciate that the phases may be altered by any magnitude. Further, a person skilled in the art will appreciate that the phase of different elements of the sample may be altered by a different magnitude. Any such embodiment or any variation of such embodiment will also fall under the scope of the present subject matter.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in enclosed FIGS. 7 and 8. can be performed in a different order from those shown and described herein.

FIGS. 1-10 are merely representational and are not drawn to scale. Certain proportions thereof may be exaggerated, while others may be minimized. FIGS. 1-10 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus, the following claims are hereby incorporated into the detailed description of the embodiments of the invention, with each claim standing on its own as a separate preferred embodiment.

The invention claimed is:

1. A method for adapting a communication signal including a preamble and a data field, the preamble includes a number of recurring samples of data, the method comprising:
   receiving the recurring samples of data by a first unit of a device, each of the recurring samples of data includes a first number of elements;
   selecting a second number of elements in a last recurring sample of the preamble by a second unit of the device, wherein the second number of elements being less than the first number of elements in the last recurring sample;
   computing phase altered values corresponding to the selected second number of elements by a third unit of the device; and
   substituting the selected second number of elements with the respective phase altered values by the third unit thereby increasing probability of detection of a boundary of the preamble at a receiver.

2. The method of claim 1, wherein the second number of elements is about half of the first number of elements.

3. The method of claim 1, wherein the phase may be altered by about 180 degrees.

4. A device for adapting a communication signal including a preamble and a data field, the preamble includes recurring samples of data, the device comprising:
   a first unit configured for receiving the recurring samples of data, each of the recurring samples of data includes a first number of elements;
   a second unit arranged for selecting a second number of elements in a last recurring sample of the preamble, wherein the second number of elements being less than the first number of elements in the last recurring sample; and
   a third unit arranged for computing phase altered values corresponding to the selected second number of elements and substituting the selected second number of elements with the respective phase altered values thereby increasing probability of detection of a boundary of the preamble at a receiver.

5. The device of claim 4, wherein the second number of elements is about half of the first number of elements.

6. The device of claim 4, wherein the third unit may alter the phase of the elements by about 180 degrees.

7. A method of identifying a preamble boundary of a communication signal including a preamble and a data field, the preamble includes a number of recurring samples of data, comprising:
   adapting the communication signal, comprising:
      receiving the recurring samples of data by a first unit of a device, each of the recurring samples of data includes a first number of elements;
      selecting a second number of elements in a last recurring sample of the preamble by a second unit of the device, wherein the second number of elements being less than the first number of elements in the last recurring sample;
      computing phase altered values corresponding to the selected second number of elements by a third unit of the device; and
      substituting selected second number of elements with the respective phase altered values by the third unit thereby increasing probability of detection of the preamble boundary at a receiver;
   computing correlation values for each of the recurring samples of the adapted signal at the receiver via a computing unit, wherein the adapted signal is communicated to the receiver;
   comparing the correlation values of each of the recurring samples of the adapted signal with one another at the receiver via a comparing unit; and
   providing indicatives of variation of the compared correlation values for identifying the preamble boundary by the comparing unit.

8. The method of claim 7, wherein the second number of elements is about half of the first number of elements.

9. The method of claim 7, wherein the phase of the second number of elements may be altered by about 180 degrees.

10. A device for identifying a preamble boundary of a communication signal including a preamble and a data field, the preamble includes a number of recurring samples of data, the device comprising:
    an adaptor for adapting the communication signal, the adaptor comprises:
       a first unit configured for receiving the recurring samples of data, each of the recurring samples of data includes a first number of elements;
       a second unit arranged for selecting a second number of elements in a last recurring sample of the preamble, wherein the second number of elements being less than the first number of elements in the last recurring sample; and
       a third unit arranged for computing phase altered values corresponding to the selected second number of elements and substituting selected elements with respective phase altered values thereby increasing probability of detection of the preamble boundary at a receiver, wherein the adapted signal is communicated to the receiver;
    a computing unit arranged for computing correlation values for each of the recurring samples of the adapted signal at the receiver; and
    a comparing unit configured for comparing the correlation values of each of the recurring samples of the adapted signal with one another at the receiver, and providing indicatives of variation of the compared correlation values for identifying the preamble boundary.

11. The device of claim 10, wherein the second number of elements is half of the first number of elements.

12. The device as claimed in claim 10, wherein the third unit alters the phase of the elements by about 180 degrees.

13. A computing system, comprising
    a processor; and
    a memory coupled to the processor, the memory having stored therein machine-readable instructions which when executed by the processor, causes the processor to perform a method for adapting a communication signal including a preamble and a data field, the preamble includes a number of recurring samples of data, comprising:
- receiving the recurring samples of data, each of the recurring samples of data includes a first number of elements;
- selecting a second number of elements in a last recurring sample of the preamble, wherein the second number of elements being less than the first number of elements in the last recurring sample;
- computing phase altered values corresponding to the selected second number of elements; and
- substituting the selected second number of elements with the respective phase altered values thereby increasing probability of detection of a boundary of the preamble at a receiver.

14. A computing system, comprising
a processor; and
a memory coupled to the processor, the memory having stored therein machine-readable instructions which when executed by the processor, causes the processor to perform a method of identifying a preamble boundary of a communication signal including a preamble and a data field, the preamble includes a number of recurring samples of data, comprising: adapting the communication signal, comprising:
- receiving the recurring samples of data, each of the recurring samples of data includes a first number of elements;
- selecting a second number of elements in a last recurring sample of the preamble, wherein the second number of elements being less than the first number of elements in the last recurring sample;
- computing phase altered values corresponding to the selected second number of elements; and
- substituting selected second number of elements with the respective phase altered values thereby increasing probability of detection of the preamble boundary at a receiver;

computing correlation values for each of the recurring samples of the adapted signal at the receiver, wherein the adapted signal is communicated to the receiver;
comparing the correlation values of each of the recurring samples of the adapted signal with one another at the receiver; and
providing indicatives of variation of the compared correlation values for identifying the preamble boundary.

* * * * *